A. G. STONE.
GATHERING SHEARS.
APPLICATION FILED JUNE 26, 1918.

1,334,816.

Patented Mar. 23, 1920.

Inventor
A. G. STONE.
By
Attorney

UNITED STATES PATENT OFFICE.

ALBERT G. STONE, OF RUSTBURG, VIRGINIA.

GATHERING-SHEARS.

1,334,816.  Specification of Letters Patent.  Patented Mar. 23, 1920.

Application filed June 26, 1918. Serial No. 242,088.

*To all whom it may concern:*

Be it known that I, ALBERT G. STONE, a citizen of the United States residing at Rustburg, in the county of Campbell and State of Virginia, have invented certain new and useful Improvements in Gathering-Shears; and I do hereby declare the following to be a full, clear, and exact description of the invention, such as will enable others skilled in the art to which it appertains to make and use the same.

This invention is an improvement in cutting implements, and has particular reference to gathering shears.

An object of the invention is to provide an improved device to be employed in gathering vegetables and small fruits which necessitate the severing of the stems thereof in order that the same may be removed without injury thereto or to the vine or plant.

Another object is the provision of shears which will permit of readily and quickly removing the vegetables and fruit in such manner that the same will be better preserved by avoiding the possibility of them falling upon the ground and becoming bruised.

A further object is the provision of shears of this character which are simple in construction, easy to manufacture and effective in carrying out the purpose for which they are designed.

The inventive idea involved is capable of receiving a variety of mechanical expressions, one of which, for the purpose of illustrating the invention, is shown in the accompanying drawing, wherein:—

Figure 2:
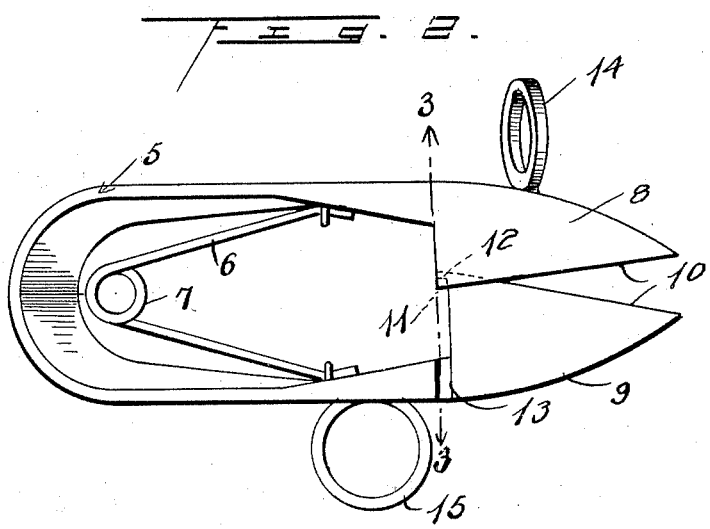
Fig. 2 is a top plan view of the shears.

The drawing illustrates what is now believed to be a preferred form of the invention, the body or main portion of which is formed from a single piece of suitable material of elongated formation and bent upon itself intermediate its ends to provide the handle portion 5, the width of the material at the bent portion being greatest and from which the sides of the handle are tapered toward their free ends. The sides and rear end of the handle portion are inclined and curved with respect to vertical, longitudinal and transverse planes passing through the handle, as clearly shown in Fig. 2 of the drawing, and attached to the inner surfaces of said sides, adjacent their forward ends, are the terminals of a spring element 6, the intermediate portion of which is provided with a coil 7 disposed adjacent the rear end of the handle portion and designed to normally spread the sides of the handle portion apart, whereby the same will be made to assume the position shown in Fig. 2.

Figure 1:
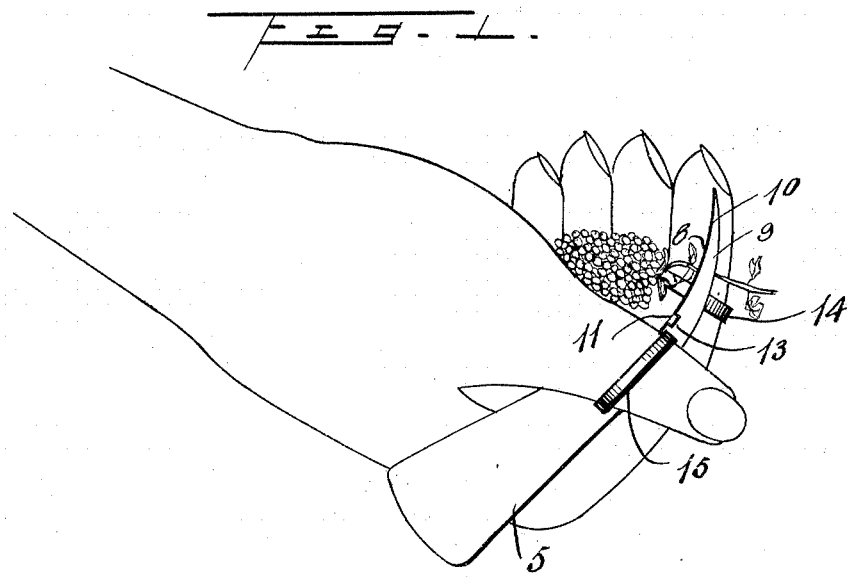
Figure 1 is a side elevation of the shears, showing the application thereof.
Figure 3:
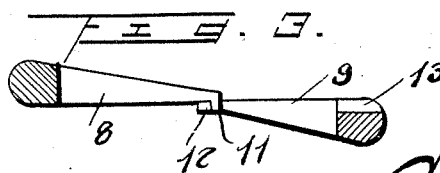
Fig. 3 is transverse section on the line 3—3 of Fig. 2.

The outer ends of the sides of the handle portion are enlarged to provide the cutting or severing blades 8 and 9, the planes of which are disposed in substantial right angular relation with respect to the handle portion, and the inner edges 10 of the blades are sharpened and adapted for frictional cutting engagement, whereby the stems of fruit and vegetables may be readily severed. The blades 8 and 9 are also curved longitudinally, as shown in Fig. 1, and tapered transversely toward their cutting edges 10, as shown in Fig. 3.

It is proposed to prevent an excessive output movement of the blades 8 and 9 with respect to each other, and, to this end, said blades are provided, respectively, at the rear ends of the cutting edges thereof with the laterally projecting lugs 11 and 12, extending at right angles to each other, and having interlocking engagement, whereby outward movement of the blades, due to the inherent resiliency of the material of the handle and that of the spring element 6 will be limited. Provision is made for a complete cutting stroke of the blades 8 and 9 by forming in the upper surface of the latter a transverse groove 13 disposed contiguous to the rear edge of the blade, and adapted to receive the lug 11 of the blade 8 when said blades are forced together to separate them.

In order to facilitate the handling of the device, the outer edge of the blade 8 is preferably provided with a finger ring 14, arranged in a plane substantially at right angles to that of said blade and adapted to receive the forefinger of the right hand of an operator. Also formed integrally upon the sides of the handle portion just rearwardly of the blade 9 and transverse groove 13 there is a thumb-receiving ring 15, preferably disposed in substantially the same plane as the blade 9.

In practice, the device is arranged between the thumb and forefinger of the right hand and the thumb engaged in the ring 15, while the forefinger is engaged in the ring 14 with the inner end of said forefinger in engagement with the adjacent side of the handle portion 15. When the device is so disposed, as clearly shown in Fig. 1, it will be apparent that a stem to be severed may be positioned between the blades 8 and 9 with the fingers and palm of the hand so bent as to form a cup into which the fruit or vegetable itself will fall when the stem is cut, such operation being accomplished by sudden inward pressure exerted upon the blade 9 by means of the thumb of the operator. In this manner it will be obvious that the fruit and vegetables may be readily and quickly severed from vines or plants without pulling upon the same and thus, by the reason of the application of the device to the hand of the operator, the fruit or vegetables will be prevented from falling upon the ground and becoming bruised when the stems are severed.

What is claimed is:

1. A device of the class described including a U-shaped handle having its sides extended forwardly to form cutting blades, coacting stop lugs carried by the rear ends of the blades, one side of said handle being provided with a groove extending transversely of the same and receiving the lug of one of the blades to permit of the free closing of the blades, and spring means to normally retain the blades open.

2. A pair of shears formed from an elongated metallic body bent intermediate its ends to form a spring handle and having its forward end portions curved longitudinally for forming cutting blades, and a spring confined between the sides of the handle.

3. The construction set forth in claim 2, and means to limit the opening of the blades.

4. A pair of shears formed from an elongated metallic body bent intermediate its ends to form a spring handle, and having its end portions curved longitudinally for forming cutting blades, spring means normally retaining the blades open, a finger ring secured to one of the blades and arranged at substantially right angles thereto, and a thumb ring secured to one side of the handle.

In testimony whereof I affix my signature in presence of two witnesses.

ALBERT G. STONE.

Witnesses:
   FANNIE GOGGIN STONE,
   ARCHER P. STONE.